United States Patent [19]

Brandle, Jr. et al.

[11] Patent Number: 5,021,302

[45] Date of Patent: * Jun. 4, 1991

[54] BISMUTH-IRON GARNETS WITH LARGE GROWTH-INDUCED MAGNETIC ANISOTROPY

[75] Inventors: Charles D. Brandle, Jr., Basking Ridge; Vincent J. Fratello, New Providence; Lars C. Luther, Basking Ridge; Susan E. G. Slusky, Highland Park, all of N.J.

[73] Assignee: AT&T Bell Laboratories, Murray Hill, N.J.

[*] Notice: The portion of the term of this patent subsequent to Mar. 3, 2004 has been disclaimed.

[21] Appl. No.: 213,431

[22] Filed: Jun. 3, 1988

Related U.S. Application Data

[63] Continuation of Ser. No. 897,565, Aug. 15, 1986, abandoned.

[51] Int. Cl.$^5$ .............................................. G11B 23/00
[52] U.S. Cl. ..................................... 428/692; 428/702; 428/900
[58] Field of Search ............... 428/692, 693, 700, 701, 428/702, 900; 212/625

[56] References Cited

U.S. PATENT DOCUMENTS

| 3,715,736 | 2/1973 | O'Donnell et al. | 340/174 TF |
| 3,989,352 | 11/1976 | Lacklison et al. | 350/151 |
| 4,183,999 | 1/1980 | Ota et al. | 428/693 |
| 4,239,805 | 12/1980 | Jonker | 428/446 |
| 4,350,559 | 9/1982 | Bondst et al. | 252/62.57 |
| 4,419,417 | 12/1983 | Le Craw et al. | |
| 4,433,034 | 2/1984 | Gualtieri et al. | 428/692 |
| 4,435,484 | 3/1984 | Breed et al. | 428/692 |
| 4,468,438 | 8/1984 | Blank et al. | 428/692 |
| 4,516,222 | 5/1985 | Sakurai et al. | 365/32 |
| 4,563,236 | 1/1986 | Ross et al. | 252/62.57 |
| 4,622,264 | 11/1986 | Hosoe et al. | 428/693 |
| 4,647,514 | 3/1987 | Le Craw et al. | 428/700 |

OTHER PUBLICATIONS

Scott et al., "Magnetoptic Properties and Applications of Bismuth Substituted Iron Garnets", IEEE Trans. Magnetics, vol. Mag 12, No. 4, p. 292, Jul., 1976.
Mada et al, "Magneto-Optic Properties of Bi-Substituted Epitaxial Lu Sm IG Films", J. Appl. Phys, 57(1), p. 3882, Apr. 15, 1985.

Primary Examiner—Paul J. Thibodeau
Attorney, Agent, or Firm—P. A. Businger; O. E. Alber

[57] ABSTRACT

High magnetic anisotropy is achieved in bismuth-iron garnet materials which comprise a significant amount of europium, samarium, or terbium. Such materials may be made in the form of epitaxial layers grown on a nonmagnetic substrate, e.g., in the manufacture of magnetic bubble devices. On account of significant Faraday rotation, such materials may also be used in magnetic-optical devices.

4 Claims, 2 Drawing Sheets

BISMUTH-IRON GARNETS WITH LARGE GROWTH-INDUCED MAGNETIC ANISOTROPY

This application is a continuation of application Ser. No. 897,565, filed Aug. 15, 1986 now abandoned.

TECHNICAL FIELD

The invention is concerned with magnetic devices such as, e.g., magnetic domain devices and magneto-optic devices comprising a bismuth-iron magnetic garnet material.

The Government has rights in this invention pursuant to Contract No. AF33615-81-C-1404 awarded by the Department of the Air Force.

BACKGROUND OF THE INVENTION

Magnetic garnet materials are of interest, e.g., in the manufacture of magneto-optic and magnetic domain devices, and their usefulness as epitaxially grown layers and as bulk crystals has been demonstrated for a variety of compositions. Of particular interest are magnetic garnet layers which are epitaxially grown on a nonmagnetic substrate; such layers play a key role in magnetic domain devices, i.e., devices in which information is represented by the presence or absence of microscopically small magnetic domains or "bubbles" which are nucleated and propagated in response to variation of a magnetic field. Magnetic domain devices have been developed, e.g., as memory devices in which domain movement typically is in loop-shaped patterns which serve as shift registers; suitable patterns may be defined, e.g., by metallic overlays or by ion-implanted regions in the magnetic layer.

Continuing development effort in the field of magnetic domain technology has led to the realization of a variety of devices, some of which are suitable for operation under adverse conditions such as conditions of elevated temperature or else of very low temperature. In this respect, bismuth-containing garnet materials have been found to be particularly advantageous as disclosed in U.S. Pat. No. 4,419,417, issued Dec. 6, 1983 to R. C. Le Craw et al.

Also, there is continuing interest in reducing magnetic domain size while maintaining or increasing domain wall mobility, and this, in turn, calls for increased magnetic anisotropy in a magnetic layer. Magnetic anisotropy is understood to have two additive components, namely strain-induced anisotropy (due to lattice mismatch between a substrate and a grown film) and growth-induced anisotropy (resulting from compositional ordering of the film). Furthermore, it is known that in the case of bismuth-containing garnets, growth-induced anisotropy is directly related to the degree of undercooling of a melt from which a film is grown, so that it has been possible to achieve high magnetic anisotropy by epitaxial growth from melts at high levels of undercooling. It has been realized, however, that high levels of undercooling have an adverse effect on production yields, and means are sought for producing high growth-induced anisotropy in magnetic layers grown from a melt at relatively low degrees of undercooling.

SUMMARY OF THE INVENTION

The invention is aimed at magnetic devices which include a magnetic material having high magnetic anisotropy so as to be capable, e.g., of sustaining small-diameter, high mobility magnetic domains. In accordance with the invention it has been discovered that such devices are obtained when the magnetic material is made of a bismuth-iron garnet material comprising at least one of the rare-earth elements europium, samarium, and terbium in a significant preferred amount. Since the atomic size of europium, samarium, and terbium is comparable to the atomic size of bismuth, it might have been expected that additions of europium, samarium, or terbium to a bismuth garnet material result in decreased magnetic anisotropy. Contrary to such expectation it has been found that such additions lead to increased magnetic anisotropy per degree of undercooling (as compared with prior-art bismuth yttrium iron garnet or bismuth gadolinium iron garnet) when a layer of the material is grown or deposited on a substrate by liquid phase epitaxy.

DETAILED DESCRIPTION

Figure 1:
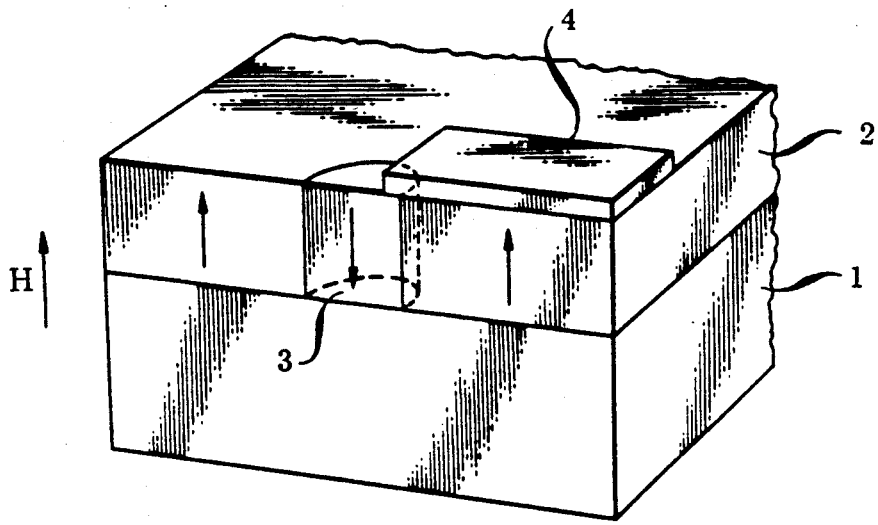
FIG. 1 schematically shows a magnetic domain device in accordance with the invention.

Shown in FIG. 1 are substrate I, magnetic layer 2 of which a portion 3 forms a magnetic domain or "bubble", and metallic overlay 4. The lattice parameters of substrate 1 are compatible with those of magnetic layer 2; typically, substrate 1 is made of a nonmagnetic garnet material. Arrows shown in the representation of magnetic layer 2 indicate magnetization in a direction parallel to bias field H, with the exception of magnetic domain 3 which is shown magnetized in an antiparallel direction.

Figure 2:
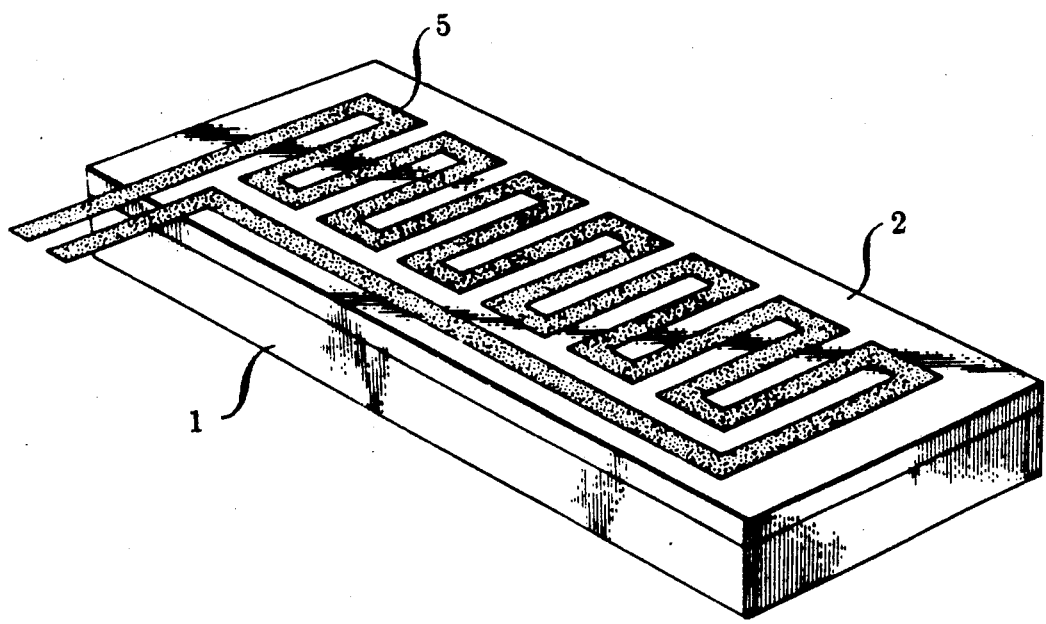
FIG. 2 schematically shows a magneto-optic device in accordance with the invention.

Shown in FIG. 2 are substrate 1, magnetic garnet layer 2, and microcircuit 5. Current flowing in microcircuit 5 induces a magnetic field which affects the optical properties of layer 2, thereby influencing light traveling in layer 2. The device can serve, e.g., as an optical switch or modulator.

In accordance with the invention a bismuth-iron magnetic garnet material is included in a device, e.g., in a form of a supported layer (2) as shown in the Figure, such material containing samarium, europium, or terbium as represented in essence by formula

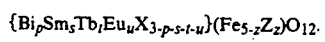

$$\{Bi_p Sm_s Tb_t Eu_u X_{3-p-s-t-u}\}(Fe_{5-z}Z_z)O_{12}.$$

Here, and throughout this disclosure, subscripts and subscript expressions represent values which are not less than zero, and X denotes one or several dodecahedral site substituent element such as, e.g., yttrium, gadolinium, lutetium, thulium, ytterbium, calcium, lead, erbium, holmium, dysprosium, praseodymium, or neodymium, Z denotes one or several tetrahedral or octahedral site substituent element such as, e.g., aluminum, gallium, silicon, germanium, lead, and platinum, and p is greater than or equal to 0.1 and z is less than or equal to 1.5 the latter being chosen primarily in the interest of assuring a Curie temperature above room temperature. Additionally, in accordance with the invention, at least one of the following three conditions holds:

s greater than 0.6, t greater than or equal to 0.01, u greater than 0.6.

Actually, and as in the case of terbium, considerably smaller amounts of samarium or europium are sufficient to realize enhanced magnetic anisotropy per degree of undercooling; limits of 0.6 formula units for samarium and europium are specified, however, in view of patent application Ser. No. 807,197 which discloses amounts of samarium or europium up to 0.6 formula units for a different and unrelated purpose.

Elements calcium, aluminum, gallium, silicon, and germanium mentioned above are preferably limited to formula amounts not exceeding 1.5, calcium preferably being present, in the interest of valence balancing, in approximately the same amount as silicon and germanium in combination. Certain material properties are conveniently influenced by choice of substituent elements; for example, the presence of terbium, dysprosium, holmium, or erbium tends to reduce the deflection angle of magnetic bubbles in a magnetic field, and the presence of gadolinium, holmium, or dysprosium diminishes the temperature dependence of certain magnetic parameters such as, in particular, the collapse field. Also adjustable, by appropriate choice of substituent elements, are properties such as magnetization, Curie temperature, magneto-optic rotation, and magnetostriction.

Conveniently, device manufacture involves liquid-phase epitaxial growth or deposition on a nonmagnetic garnet substrate having lattice parameters, which are compatible with those of the magnetic layer; gadolinium-gallium garnet substrates are suitable in this respect for some compositions. Growth is from a melt containing desired layer constituents, as well as a flux component acting as solvent for the layer constituents. The composition of the melt and its temperature are such that the melt is undercooled (supersaturated) with respect to layer constituents.

As a result of the presence of rare-earth elements samarium, europium, or terbium as specified above, greater growth-induced magnetic anisotropy is realized per degree of undercooling as compared with a corresponding bismuth-containing material not containing such substitutional rare-earth elements. Since, in practice, a smaller amount of undercooling results in reduced homogeneous nucleation in the course of liquid-phase epitaxy and in reduced defect density, uniformity of grown layers is enhanced. In commercial practice, increased layer uniformity due to the presence of samarium, europium, or terbium in bismuth-iron garnet materials, in turn, would result in increased yield in device manufacture.

EXAMPLE 1

Films of rear-earth garnets $\{Bi_xR_{3-x-y}Pb_y\}Fe_5O_{12}$, where R represents one of the elements Pr, Nd, Sm, Eu, Gd, Tb, Dy, Ho, Er, Tm, Lu, and Y were grown, lattice-matched to suitable (111)-substrates including rare-earth gallium garnets and garnets substituted with Sc, CaZr, and MgCaZr, such substrates having lattice constants in the range of from 1.2295 to 1.2640 nanometer. In cases where a close lattice match was not possible, films were grown on two different substrates having lattice constants bracketing the lattice constant of the film, so that any effect of the mismatch tended to average out. Growth was from a melt comprising a lead-bismuth-vanadium oxide flux, and the fraction of garnet oxides in the melt was chosen so that the saturation temperature was approximately 900 degrees C. The molar radio of iron oxide to rare-earth oxide was chosen as approximately equal to 40; this results in optimized bismuth incorporation while a magnetoplumbite phase is safely avoided.

Four samples were grown from each melt, two at a growth temperature of approximately 850 degrees C, and two at approximately 875 degrees C. Measured values obtained by methods as described below were consistent within the experimental uncertainties, and material characteristics as reported in Table 1 are base on means values for growth at 850 degrees C.

The bismuth and lead concentrations in the films, x and y, respectively, were determined by x-ray fluorescence with a non-dispersive x-ray milliprobe spectrometer using Cr radiation and an x-ray analyzer made by the Princeton Gamma-Tech company. The refractive index, n, was determined by a prism coupling technique at a wavelength of 633 nanometers; this technique was also used to determine film thickness. Film lattice constant, $a_f$ was determined by measuring the displacement of the (888) Bragg reflection of the film from that of the substrate, and correcting for mismatch strain. A vibrating sample magnetometer was used to measure the saturation magnetization, $4\pi M_s$, of the samples at temperatures of approximately 25 degrees C and 140 degrees C, and to determine the Curie temperature, $T_c$. The growth-induced contribution to uniaxial anisotropy was determined as the difference between total uniaxial anisotropy and stress-induced uniaxial anisotropy. Total uniaxial anisotropy, in turn, was determined from the measured effective anisotropy field and the measured saturation magnetization, and stress-induced uniaxial anisotropy was calculated from Young's modulus, Poisson's ratio, and the magnetostriction coefficient of iron garnets, and the lattice mismatch between film and substrate.

Figure 3:
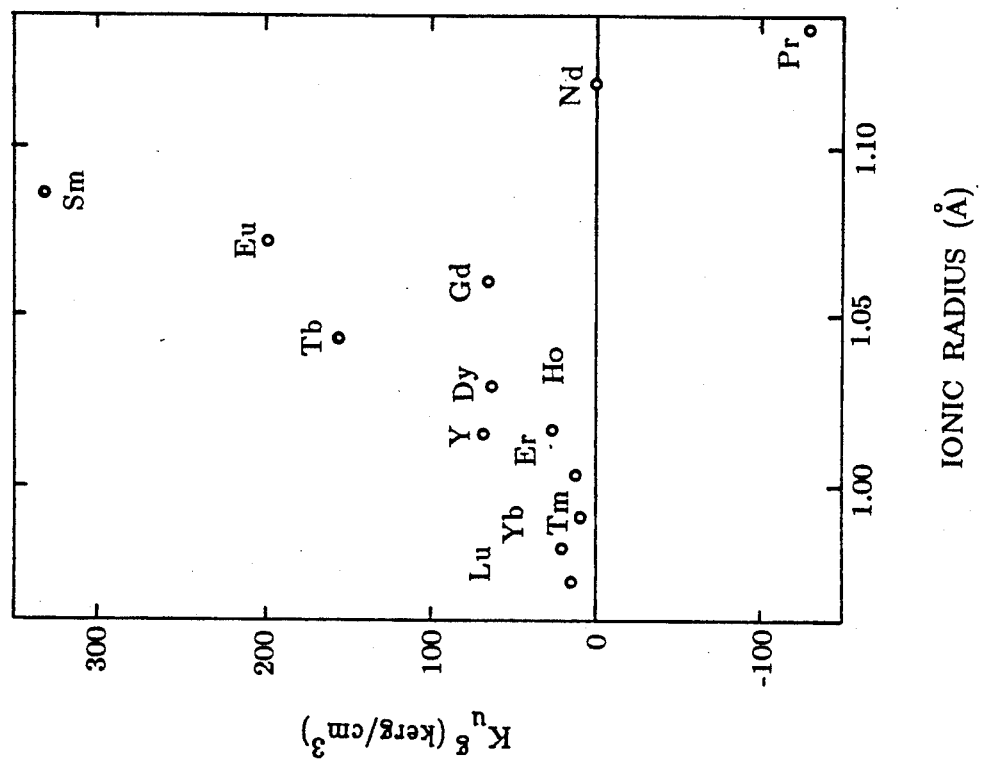
FIG. 3 is a graph representing room-temperature growth-induced anisotropy as a function of rare-earth ionic radius of compositions of the invention, as well as, for the sake of comparison, of compositions outside the scope of the invention.

As can be seen from Table 1 and from FIG. 3, films comprising Sm, Eu, or Tb have superior magnetic anisotropy; and thus, in accordance with the invention, such films are of particular interest in device manufacture.

EXAMPLE 2

A melt was prepared including flux constituent oxides PbO, $Bi_2O_3$, and $MoO_3$ in respective amounts of approximately 1650 grams, 309 grams, and 114.4 grams, and garnet constituent oxides as follows: 2.72 grams $Y_2O_3$, 0.35 gram $Sm_2O_3$, 0.39 gram $Gd_2O_3$, 0.30 gram $Tb_2O_3$, 2.40 grams CaO, 5.48 grams $SiO_2$, 7.75 grams $GeO_2$, and 140.9 grams $Fe_2O_3$. The saturation temperature of this melt is approximately 883 degrees C.

Films were grown on gadolinium gallium garnet substrates at various growth temperatures, and film and material properties were measured and calculated. A representative film, grown at an approximate temperature of 806 degrees C (approximately 77 degrees C undercooling had a composition as represented by the approximate formula $\{Bi_{0.4}Sm_{0.1}Tb_{0.1}Gd_{0.1}Y_{1.6}Ca_{0.7}\}(Fe_{4.4}Si_{0.3}Ge_{0.3})O_{12}$. The growth-induced anisotropy of this film was determined as approximately equal to 84.1 kerg/cm$^3$ which compares favorably with a growth-induced anisotropy of approximately 60 kerg/cm³ in the case of a comparison specimen $\{Bi_{0.4}Y_{1.9}Ca_{0.7}\}(Fe_{4.4}Si_{0.3}Ge_{0.3})O_{12}$ grown under the same conditions.

Figure 4:
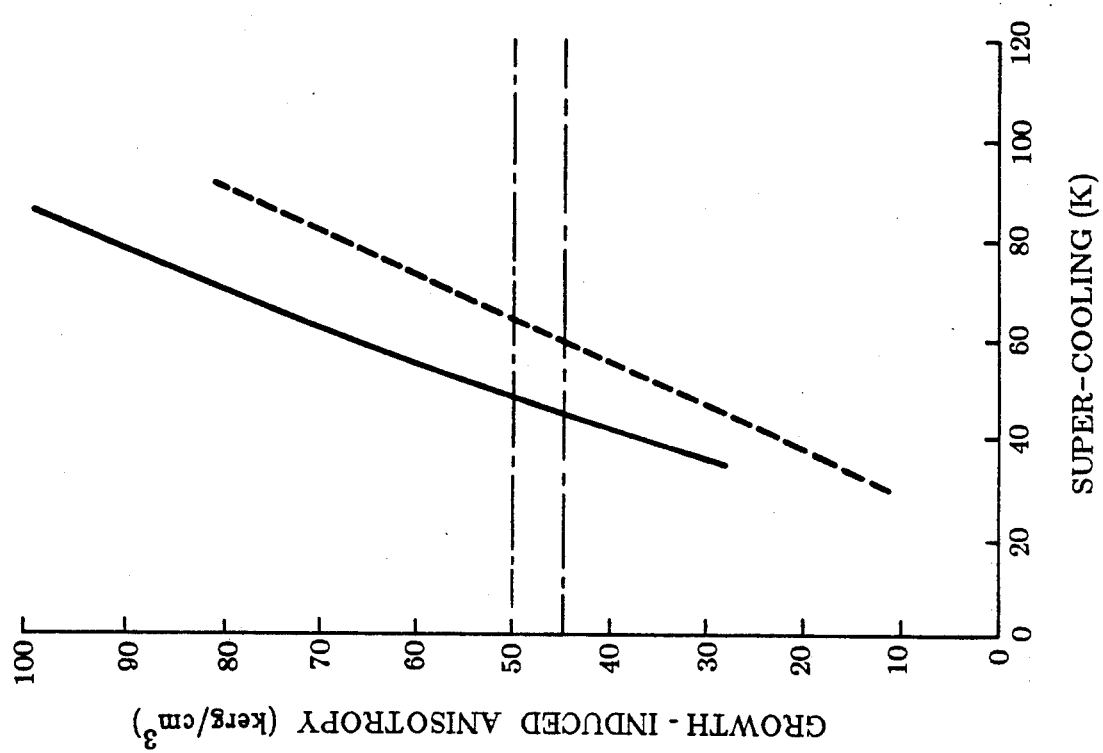
FIG. 4 is a graph representing growth-induced anisotropy as a function of undercooling of a melt for a composition of the invention and, for the sake of comparison, for a prior art reference composition.

In FIG. 4, the solid curve is based on growth experiments at various levels of undercooling of a melt as described above, and the broken line corresponds to growth of prior-art $\{Bi_xY_{3-x}\}Fe_5O_{12}$. Chain-dotted lines indicate an approximate range from 45 to 50 kerg/cm³ for growth-induced magnetic anisotropy of interest in the manufacture of 6-micrometer-period magnetic bubble devices. It can be seen from FIG. 4 that, for a bismuth-samarium-terbium material of the invention, such magnetic anisotropy results from undercooling in an approximate range of 45 to 50 degrees K, as contrasted with an approximate range of 60 to 65 degrees C. in the case of a prior-art material.

TABLE 1

Properties of $\{Bi_xR_{3-x-y}Pb_y\}Fe_5O_{12}$ Films

| R | x ±10% | y ±10% | $a_f$ ±10⁻⁴ nm | n ±0.005 | $4\pi M_s$ ±20 Oe ± 5% | $T_c$ ±2° C. | $K_u^g$ ±2 kerg/cm³ |
|---|---|---|---|---|---|---|---|
| Sm | 0.51 | 0.09 | 1.2549 | 2.437 | 1850 | 301 | 331 |
| Eu | 0.48 | 0.08 | 1.2521 | 2.422 | 1380 | 303 | 199 |
| Tb | 0.34 | 0.06 | 1.2460 | 2.405 | 470 | 292 | 156 |
| Y | 0.34 | 0.05 | 1.2404 | 2.367 | 1920 | 281 | 69 |
| Gd | 0.40 | 0.07 | 1.2497 | 2.406 | 330 | 292 | 65 |
| Dy | 0.34 | 0.06 | 1.2433 | 2.401 | 660 | 287 | 59 |
| Ho | 0.32 | 0.04 | 1.2406 | 2.392 | 1110 | 285 | 26 |
| Yb | 0.31 | 0.04 | 1.2332 | 2.381 | 1660 | 274 | 21 |
| Lu | 0.38 | 0.04 | 1.2315 | 2.374 | 1860 | 270 | 17 |
| Er | 0.31 | 0.06 | 1.2379 | 2.386 | 1290 | 279 | 12 |
| Tm | 0.30 | 0.04 | 1.2354 | 2.385 | 1550 | 280 | 9 |
| Nd | 0.68 | 0.11 | 1.2614 | 2.459 | 2110 | 311 | ~0 |
| Pr | 0.70 | 0.15 | 1.2658 | 2.478 | 2250 | 319 | −139 |

What is claimed is:

1. Device comprising a layer of epitaxially grown magnetic garnet material, said material having a composition which is essentially as represented by the formula $$\{Bi_pTb_tX_{3-p-t}\}(Fe_{5-z}Z_z)O_{12},$$

where X denotes at least one dodecahedral site substituent element selected from the group consisting of yttrium samarium, europium, gadolinium, ytterbium, calcium, erbium, holmium, dysprosium, praseodymium, and neodymium, Z denotes at least one tetrahedral or octahedral site substituent element selected from the group consisting of aluminum, gallium, silicon, and germanium, p is greater than or equal to 0.1, z is less than or equal to 1.5 and t is greater than 0.6 and wherein the amount of any one or both of samarium and europium when used is greater than 0.6 each.

2. Device of claim 1 in which said magnetic garnet material is disposed as an epitaxial layer on an essentially nonmagnetic garnet substrate.

3. Device of claim 1, said device comprising means for propagating magnetic bubbles in a layer of said material.

4. Device of claim 1, said device comprising means for influencing the propagation of light in a layer of said material.

* * * * *